July 8, 1958

J. L. McLUCAS 2,842,760

OBJECT LOCATING APPARATUS

Filed May 6, 1953

INVENTOR
John L. Mc Lucas

BY *Moore & Hall*

ATTORNEYS

INVENTOR
John L. McLucas

BY *Moore & Hall*

ATTORNEYS

United States Patent Office 2,842,760
Patented July 8, 1958

2,842,760

OBJECT LOCATING APPARATUS

John L. McLucas, State College, Pa., assignor to Haller, Raymond and Brown, Inc., State College, Pa., a corporation of Pennsylvania Application May 6, 1953, Serial No. 353,401

12 Claims. (Cl. 343—6)

This invention relates to object locating devices.

The radar type of object locating device is well known and is highly respected for its accuracy and overall utility. It has, however, one major disadvantage in that it reveals the location of the ship, submarine or other craft carrying the radar set. Another type of object locating device may take the form of a facsimile pick-up intercepting light or infra red radiation from the objects to be located and feeding its output to a cathode ray tube. The latter device has an advantage in that it does not reveal the presence of the transmitting station, but it fails to accurately obtain the range of a distant object. The primary object of this invention is to secure the advantages of both of the above forms of object locating systems without the disadvantages of either. Other objects and advantages of the invention will appear as this description proceeds.

In carrying out the foregoing object, I provide a facsimile pick-up device which scans at a rapid rate in a vertical plane and which is rotated in a horizontal plane at a slower rate. The output of this device is displayed upon the cathode ray tube provided with a sweep similar to that employed in conventional plan position indicating systems. The circular sweep of the cathode ray tube is synchronized with the angular movement of the facsimile pick-up head, and therefore the angular position of any object may be determined by the angular position thereof relative to the center of the face of the cathode ray tube. Normally the searching for enemy craft is carried on by use of the facsimile device which of course does not emit radiations and therefore does not aid the enemy. Once an enemy craft appears, the direction of it may be accurately determined. In order to ascertain the distance of the object there is mounted adjacent the facsimile pick-up a radar antenna which is rotated in a horizontal plane synchronously with the facsimile pick-up and which may be brought into action for a very short interval, say a few seconds, to thereby ascertain the range of the remote object. Alternatively both range and distance may be secured with the radar means. In any case the major advantage is that the radar set is not used for routine search work, but only for short intervals after the object has already been discovered by the facsimile pick-up means.

One feature of the invention is an arrangement whereby the outputs of both the facsimile pick-up head and the radar receiver are displayed on the face of a single cathode ray tube in such a manner that the angular position of the spot on the cathode ray tube face, representative of the object, is the same by both the radar and the optical means.

The invention is described in detail in connection with use on submarines. Both the radar antenna and the facsimile pick-up head are located at the upper end of the periscope and rotate together, in a horizontal plane. However, the invention is nowise limited to use on submarines but may be used on the ground or on any type of craft.

Figure 1:
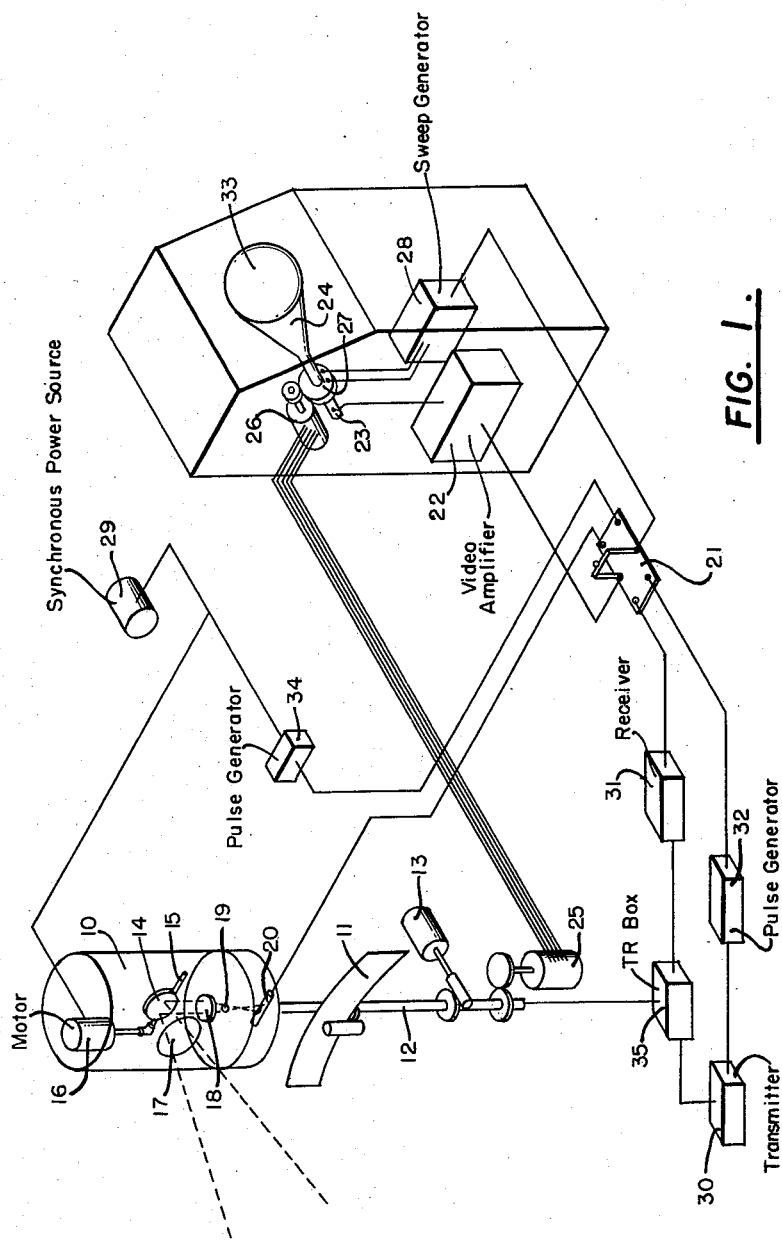
Figure 1 is a schematic diagram of one form that the invention may take.

In the drawing there is shown an exploring unit comprising the facsimile pick-up head 10 and the radar antenna 11 mounted atop the periscope of a submarine, or atop the antenna mast of a craft or ground station.

The periscope or mast includes a shaft 12 and a motor 13 for rotating the elements 10 and 11 in a horizontal plane. The motor 13 may merely rotate the elements 10 and 11 at a constant rate, or it may also have a selsyn arrangement whereby the device may be stopped at any desired angular position. The facsimile head 10 includes a double faced mirror 14 mounted on a horizontal shaft 15 rotated by a synchronous motor 16. The facsimile head 10 is composed of opaque material except for window 17. Light from the remote object and its surroundings enters the window 17 and falls upon mirror 14 which scans in a vertical plane and directs the scanning information upon lens 18 toward pin hole 19 and thence to phototube 20. When double pole double throw switch 21 is thrown to the right the output of the tube 20 is impressed upon video amplifier 22 whose output feeds grid 23 of the cathode ray tube 24. The radial sweep of tube 24 is controlled by suitable deflection coils or plates which are rotated synchronously with shaft 12 through Selsyn transmitter 25, Selsyn receiver 26, and suitable gears. The deflection coils or plates are mounted on rotating unit 27 and are supplied with sweep potential by sweep generator 28. The synchroous pulser 34 and the synchronous motor 16 are supplied by a common source of alternating current 29 and are so arranged that the spot on tube 24 leaves its normal position in the center of the tube concurrently with mirror 14 receiving light from the lowermost part of the picture. The spot on the tube 24 then moves radially outward as the mirror 14 rotates to intercept light rays from higher and higher elevations. Just before the other face of the mirror 14 starts to receive light from the lower edge of the picture the trace on tube 24 flies back to zero and is ready to start another radial trace as soon as mirror 14 again begins to receive light from the lower edge of the picture. In addition to the radial trace on tube 24 there is the angular rotation thereof concurrently with rotation of shaft 12. The result is that a picture of the horizon appears around the center of the face of the cathode ray tube 24. The angular position of the objects may be determined in the same way as is done with conventional P. P. I. systems but accurate distance measurements are not possible without use of the radar means now to be described.

Radar antenna 11 is mounted on shaft 12 and is directed in the same azimuthal direction as the window 17, of facsimile head 10. The radar antenna is normally deenergized but may be placed into action by moving double throw switch 21 to the left. When switch 21 has been thrown to the left the phototube 20 is disconnected from amplifier 22 and therefore the facsimile head 10 produces no effect upon the cathode ray tube 24. However, the radar set is then active in the usual way. It is apparent to those skilled in the art that when switch 21 is thrown to the left the antenna 11, the TR box 35, the transmitter 30, the receiver 31, the pulser 32, the video amplifier 22, sweep generator 28, the ray deflecting means 27, the grid 23, the selsyn means 25, 26, and the cathode ray tube 24, comprises a conventional "plan position indicator" type of radar set. The antenna 11 is therefore of the type commonly employed in P. P. I. sets, that is it has sharp directivity in a horizontal plane. In other words, its radiations are confined to a sheet in a vertical plane.

The foregoing apparatus is used by first moving switch 21 to the right for normal observation operations. The facsimile head 10 scans the region around the submarine and any distant objects will appear upon the face of the cathode ray tube. The direction of these objects may be determined from the graduations 33 around the face of the tube or in any other well known way. To obtain range, the switch 21 is moved to the left for a few seconds during which the radar set will indicate range in the usual way.

In order to illustrate particular values and/or speeds that may be used, it is stated that motor 16 may rotate at 1800 R. P. M., whereby the mirror scan rate is 60 scans per second. The instantaneous field of view of the window and pinhole combination may be 0.002 radian. The lens 18 may be three inches in diameter and have a focal length of one foot, the pin hole 19 may be about 1/40 inch in diameter, and there may be about 3000 vertical scans per rotation of the shaft 12. The shaft 12 may complete one full revolution every 50 seconds.

If the two-faced mirror 14 is replaced by an eight-faced mirror, shaft 12 may complete a full revolution every twelve seconds, corresponding to usual radar antenna rotation rates.

Figure 2:
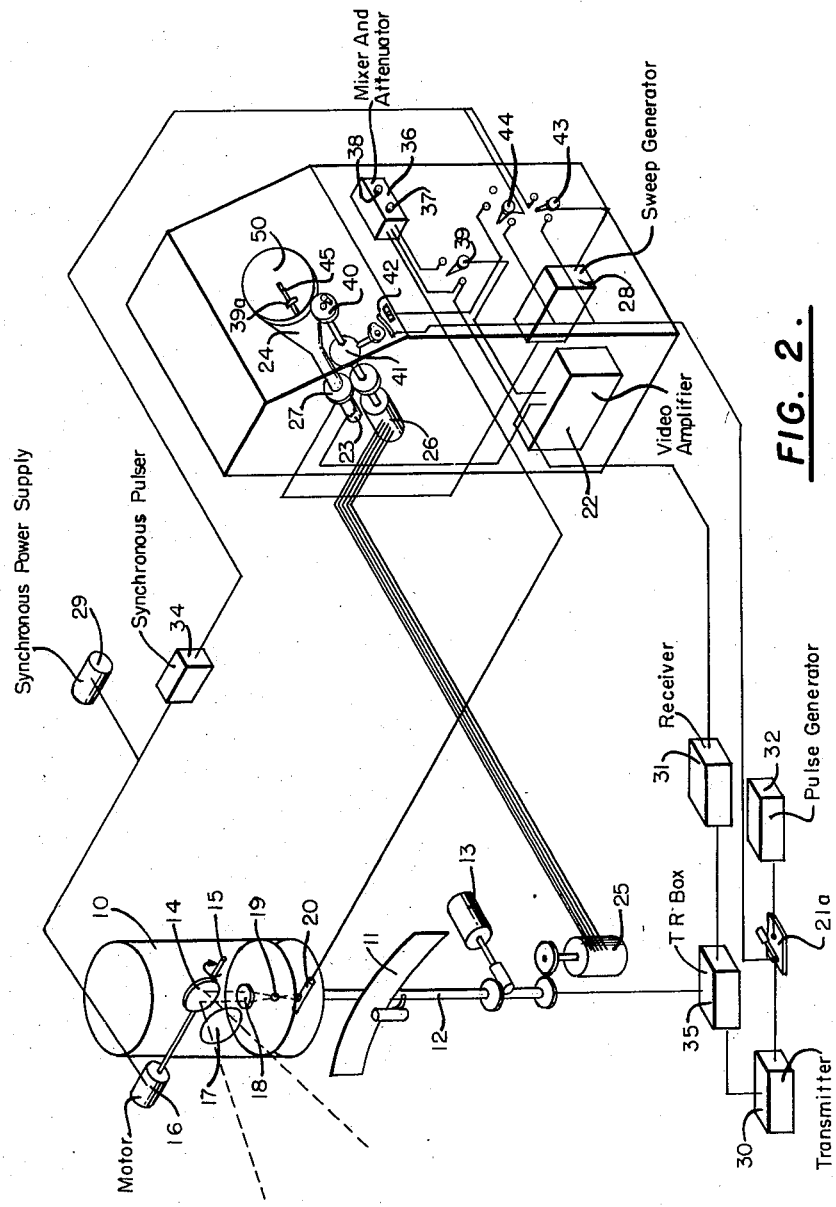
Figure 2 is a schematic diagram of a modified form of the invention.

If two installations of the type shown in Figure 1 or 2 are placed at separate spaced points on a single vehicle, the distance of a distant object or craft could be computed by triangulation.

Figure 2 illustrates another form of the invention in which many of the parts bear like reference numbers to corresponding parts on Figure 1 and are therefore similar thereto. The device shown in this figure may be used as a conventional P. P. I. type radar set, or as a facsimile display device, as a device which displays both the results of the P. P. I. set and the facsimile device, or as a device that normally displays a facsimile picture but may have a radar signal switched on momentarily to determine range.

To operate the device of Figure 2 as a conventional P. P. I. radar set, switch 21a is closed, switch 43 is thrown to the left, switch 44 is moved to the right hand or open circuit contact point, and switch 39 is moved to the left. It will now be apparent in this position the keyer 32, transmitter 30, TR box 35, antenna 11, drive motor 13, synchros 25 and 26, receiver 31, video amplifier 22, cathode ray tube 24, and sweep generator 28 are standard radar components connected in a conventional manner.

In order to operate the system as a facsimile device only (without transmission of any radar signals), switch 21a is opened, and switches 43, 44 and 39 moved to the right. Under these conditions visible or infrared radiations are picked up from distant objects by mirror 14 which is driven by motor 16. The energy thus picked up is focused by lens 18 onto slit 19, thence to detector 20, thence to mixer unit 36. The mixer 36 provides a gain control illustrated by knob 37. The sweep generator 28 is actuated by synchronous pulser 34 (which is in turn actuated by synchronous power supply 29), whereby the sweep rate of the cathode ray tube is synchronized with the rotation of mirror 14. The output of photo-cell 20 passes through mixer 36 to video amplifier 22 to the grid 23 of the cathode ray tube. Therefore, the beam intensity of tube 24 is varied according to the output of photoelectric cell 20. Hence, a picture appears on the face of the cathode ray tube 24.

In event it is desired to have both the radar signal and the facsimile one appear on the cathode ray tube face, switch 21a is opened, switches 39 and 43 are thrown to the right and switch 44 is thrown to the left. Thus adjusted, the apparatus functions as follows: synchronous pulser 34 triggers both sweep generator 28 and radar transmitter 30, whereby the sweep rate on the cathode ray tube face is synchronized with the rotation of the mirror 14 and with the transmission of pulses. Return pulses from the radar receiver 31 are also fed into the mixer 36 and thence to the video amplifier 22 which will of course impress the resulting pulse on grid 23. The mixer and attenuator has two intensity control knobs 37 and 38 for respectively controlling the gain of the signal from photocell 20 and the gain of the signal from the output of receiver 31. Hence, it is a simple matter to correlate the radar and facsimile signals from a single object by varying the gains of the two signals.

A fourth manner in which the apparatus of Figure 2 may operate is to use the facsimile device (with the radar silent) until the range of an object is spotted at which time the radar is operated for a short interval to determine the range of the remote object. This is achieved by placing switch 44 in its middle position, moving switch 39 to the left, and switch 43 to the right. Switch 21a will remain open. Cursor 45 on the front of the cathode ray tube 24 is mounted on rotatable member 50 which is geared to handwheel 40. The handwheel is set so that cursor 45 is aligned with the target 39a (as indicated by by the facsimile device) and then as the synchro 26 rotates the differential 41 it closes switch 42 momentarily (say for 1/25 second) whenever the synchro 26 is aligned with the setting of the handwheel, the switch 42 being open at all other times. Hence, the radar set operates for 1/25 second and illuminates the target to establish its range. The radar data is then recorded on the face of the cathode ray tube to show the range. After synchro 26 passes the point where switch 42 is closed, the radar set is silent again until the antenna rotates almost one revolution when the switch 42 closes again. When switch 44 is thrown to the right total radar silence is resumed.

I claim to have invented:

1. An object locating system comprising rotatable means carrying a radar antenna and a facsimile pick-up head, a radar set having a radar transmitter and a radar receiver both cooperating with said antenna, a cathode ray tube having beam deflecting means, means cooperating with the rotatable means and the beam deflecting means for effecting synchronous rotation of the rotatable means and the beam, said tube having a control grid, and means for selectively energizing said control grid with the output of the radar receiver or the output of said facsimile pick-up head.

2. An object display system comprising means for scanning the received light in one plane, said means having an output, means for rotating the scanning means in a second plane, a cathode ray tube having a grid and beam deflecting means, means for energizing said grid according to the output of the scanning means, means cooperating with the beam deflecting means for rotating the beam in synchronism with the rotation of the scanning means, and means for synchronously controlling the rate of scanning of the scanning means and the radial sweep of the beam.

3. An object locating system as defined in claim 1 in which the facsimile pick-up head includes scanning means, and means for effecting synchronous motion of the scanning means and the radial sweep of the beam.

4. An object display system comprising mounting means rotatable about a vertical axis and carrying a directive radar antenna and a directive facsimile pick-up head, said facsimile pick-up head including means to scan in a vertical plane and to produce an output dependent on the scanned light received, a radar set including a pulsed transmitter and a receiver both connected to said antenna, a cathode ray tube having means for producing a radial trace, control means for controlling the last-named means according to either the said rate of scan in the vertical plane or the pulse repetition rate of the radar set, and means for synchronously rotating the mounting means and the radial trace.

5. An object display system comprising a rotatable mount having a directive radio antenna mounted on the same and a directive facsimile head also mounted thereon; the antenna and the head always pointing in common azimuthal directions; a cathode ray tube having means for producing a radial trace and for rotating the radial trace; means for rotating the mount and effecting rotation of the radial trace in synchronism; a pulse echo set having a pulse transmitter and a receiver coupled to said antenna; said facsimile head including scanning means; means for synchronizing the scanning of the scanning means, the pulse repetition rate of the pulse transmitter and the radial repetition rate of the beam of the radial trace; said cathode ray tube having a control grid; and means operable to energize said control grid according to the output of either said receiver or of said facsimile pick-up head.

6. An object display system comprising a rotatable mount having a directive radio antenna mounted on the same and a directive facsimile head also mounted on the same; the antenna and said head always pointing in common azimuthal directions; a cathode ray tube having means for producing a radial trace and for rotating the radial trace; means for rotating the mount and for effecting rotation of the trace in synchronism; a pulse echo set having a pulse transmitter and a receiver coupled to said antenna; said facsimile head including scanning means; means for synchronizing the scanning of the scanning means, the pulse repetition rate of the pulse transmitter and the radial repetition rate of the beam of the radial trace; said cathode ray tube having a control grid; and means operable to energize said control grid according to the combined output of the receiver and the facsimile pick-up head.

7. An object display device comprising a rotatable mount movable in one plane and carrying a mirror scanning in a plane perpendicular to the first-named one, a cathode ray tube, means for producing a radial trace on the face of said tube and including means whereby the beam of the tube oscillates radially in synchronism with the scanning rate of said mirror, means for effecting rotation of the trace in synchronism with the rotation of said mount, and means for controlling the intensity of the beam according to the intensity of the light intercepted by said mirror.

8. An object display device comprising a rotatable mount carrying directive optical means for scanning in elevation and a directive radio antenna; both said directive scanning means and the antenna having common azimuths and being rotatable to different azimuthal angles; a cathode ray tube and means for producing a beam in said tube that oscillates radially and rotates about the center of the tube; synchronous means for synchronizing the rotation of the trace about the center of the tube with the rotation of said mount; a pulse echo set having a transmitter and a receiver coupled to said antenna; a rotatable cursor on the face of said cathode ray tube; means for energizing the pulse echo set when the cursor and the synchronous means have predetermined relative angles; and means for controlling the radial repetition rate of the cathode ray tube according to the scanning rate of the directive optical means and the pulse rate of the pulse echo set.

9. An object display device as defined in claim 8 having a grid for the cathode ray tube and means for jointly applying the outputs of the scanning means and of the pulse echo receiver to said grid.

10. An object display device as defined in claim 9 in which the last-named means includes means for varying the relative signal strength of the outputs of the scanning means and the receiver before applying them to said grid.

11. An object locating system comprising rotatable means carrying a radar antenna and a facsimile pick-up head, a radar set having a radar transmitter and a radar receiver both cooperating with said antenna, a cathode ray tube having beam deflecting means, means cooperating with the rotatable means and the beam deflecting means for effecting synchronous rotation of the rotatable means and the beam, said tube having a control grid, and means for energizing said control grid with the outputs of the radar receiver and the facsimile pick-up head.

12. An object display system comprising a rotatable mount having a directive radio antenna mounted on the same and a directive facsimile head also mounted thereon; the antenna and the head always pointing in common azimuthal directions; a cathode ray tube having means for producing a radial trace and for rotating the radial trace; means for rotating the mount and effecting rotation of the radial trace in synchronism; a pulse echo set having a pulse transmitter and a receiver coupled to said antenna; said facsimile head including scanning means; means for synchronizing the scanning of the scanning means, the pulse repetition rate of the pulse transmitter and the radial repetition rate of the beam of the radial trace; said cathode ray tube having a control grid; and means operable to energize said control grid according to the outputs of said receiver and said facsimile pick-up head.

References Cited in the file of this patent
UNITED STATES PATENTS

| | | |
|---|---|---|
| 2,408,742 | Eaton | Oct. 8, 1946 |
| 2,551,589 | Everhart | May 8, 1951 |
| 2,582,962 | Burroughs | Jan. 22, 1952 |
| 2,597,895 | Novy | May 27, 1952 |
| 2,659,075 | Collins et al. | Nov. 10, 1953 |